US012064956B2

(12) United States Patent
Tokuda

(10) Patent No.: US 12,064,956 B2
(45) Date of Patent: Aug. 20, 2024

(54) PRINTING DEVICE AND PRINTING METHOD

(71) Applicant: CASIO COMPUTER CO., LTD., Tokyo (JP)

(72) Inventor: Yusuke Tokuda, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 94 days.

(21) Appl. No.: 17/888,069

(22) Filed: Aug. 15, 2022

(65) Prior Publication Data

US 2023/0115479 A1 Apr. 13, 2023

(30) Foreign Application Priority Data

Sep. 24, 2021 (JP) ................................ 2021-155102

(51) Int. Cl.
*B41J 11/00* (2006.01)
*B41J 2/32* (2006.01)
*B41J 3/407* (2006.01)
*B41J 11/04* (2006.01)

(52) U.S. Cl.
CPC .............. *B41J 11/005* (2013.01); *B41J 2/32* (2013.01); *B41J 11/0045* (2013.01); *B41J 11/04* (2013.01)

(58) Field of Classification Search
CPC ........ B41J 11/005; B41J 11/04; B41J 3/4075; B41J 2/32
See application file for complete search history.

(56) References Cited

U.S. PATENT DOCUMENTS

| | | | | |
|---|---|---|---|---|
| 6,788,326 | B2 | 9/2004 | Sasaki | |
| 2006/0198680 | A1* | 9/2006 | Yamamoto | B41J 2/325 400/120.16 |
| 2019/0263150 | A1* | 8/2019 | Iijima | B41J 11/04 |

FOREIGN PATENT DOCUMENTS

| | | | |
|---|---|---|---|
| JP | 2003291385 | A | 10/2003 |
| JP | 2013022892 | A | 2/2013 |
| JP | 2018108679 | A | 7/2018 |

OTHER PUBLICATIONS

Japanese Office Action (and an English language translation thereof) dated Jun. 13, 2023, issued in counterpart Japanese Application No. 2021-155102.

* cited by examiner

*Primary Examiner* — Justin Seo
*Assistant Examiner* — Kendrick X Liu
(74) *Attorney, Agent, or Firm* — Holtz, Holtz & Volek PC

(57) ABSTRACT

The printing device comprises: a print head for printing on a tape; a platen roller for conveying the tape by rotation with the tape held between the print head and the platen roller; a supporter for rotatably supporting the platen roller; and a cam including a first guide for releasing pressing of the platen roller against the print head and a second guide for pressing the platen roller against the print head.

8 Claims, 7 Drawing Sheets

PRINTING DEVICE AND PRINTING METHOD

CROSS-REFERENCE TO RELATED APPLICATION

This application claims the benefit of Japanese Patent Application No. 2021-155102, filed on Sep. 24, 2021, the entire disclosure of which is incorporated by reference herein.

FIELD

The present disclosure relates to a printing device and a printing method.

BACKGROUND

Printing devices that create a label by printing a letter, a figure, and/or the like on a strip-shaped printing medium are known.

For example, a printing device described in Unexamined Japanese Patent Application Publication No. 2003-291385 presses a thermal recording paper against a thermal head by means of a platen roller that presses the thermal head against the thermal recording paper and drives the thermal head to print. This printing device uses different springs in each case when the platen roller is pressed against the thermal head and when the platen roller is spaced apart from the thermal head.

SUMMARY

A printing device according to the present disclosure comprises:

- a print head for printing on a tape;
- a platen roller for conveying the tape by rotation with the tape held between the print head and the platen roller;
- a supporter for rotatably supporting the platen roller; and
- a cam including a first guide for releasing pressing of the platen roller against the print head and a second guide for pressing the platen roller against the print head.

BRIEF DESCRIPTION OF THE DRAWINGS

A more complete understanding of this application can be obtained when the following detailed description is considered in conjunction with the following drawings, in which.

DETAILED DESCRIPTION

Figure 5A:
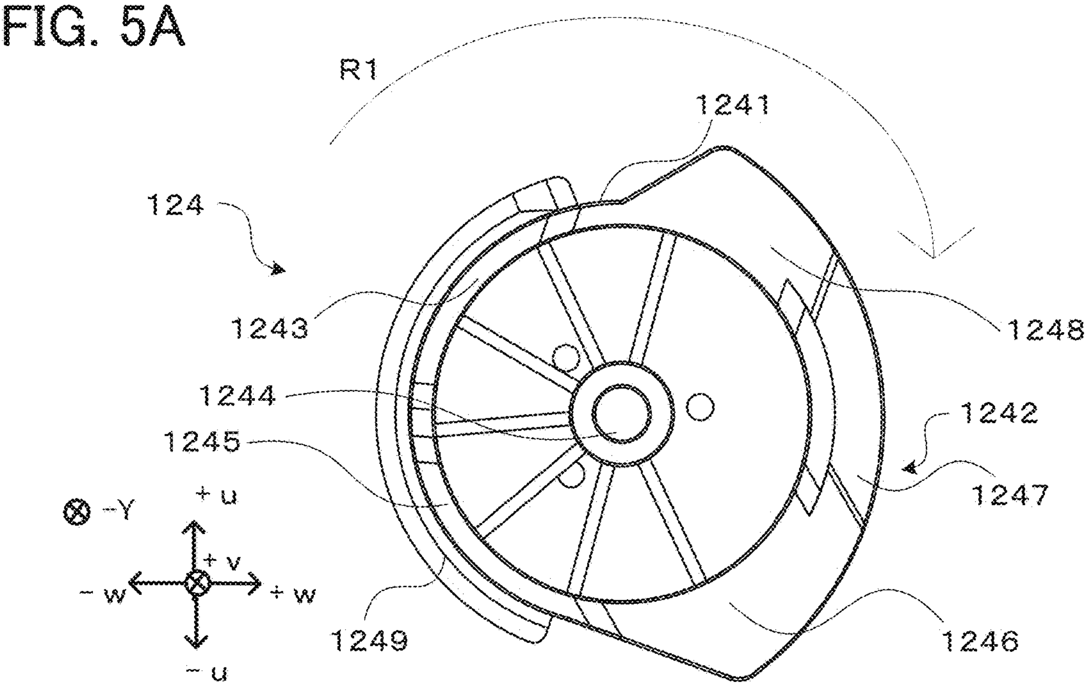
FIG. 5A is a bottom view of a cam.
Figure 5B:
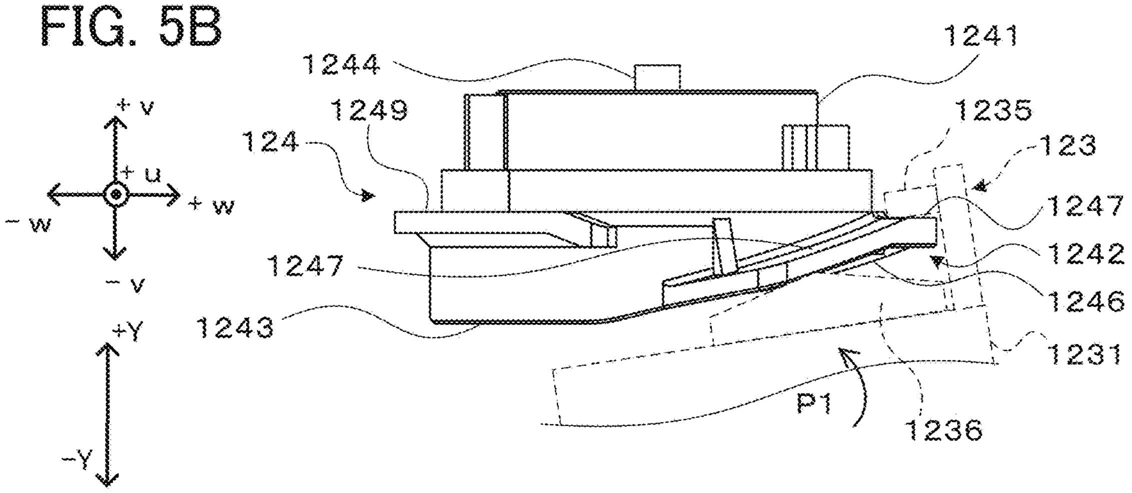
FIG. 5B is a side view of the cam.
Figure 5C:
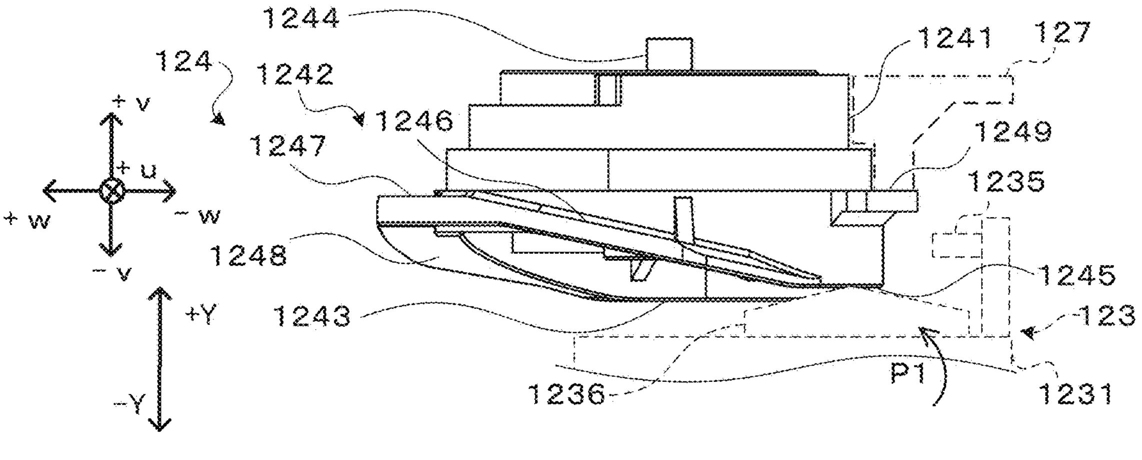
FIG. 5C is a side view from a viewpoint rotated 180 degrees from FIG. 5B.

The following is a detailed description of the printing device according to the embodiment of the present disclosure with reference to the drawings. In the following description, an X axis is a direction in which the printing tape is discharged, a Y axis is a direction of the rotation axis of a cam described later, and a Z axis is a direction of the rotation axis of the platen roller, as indicated by the arrows in each figure. In FIGS. 5A to 5C, as auxiliary axes, a u-axis is set as the front direction of the cam; a v-axis as the axial direction of the cam; and a w-axis as the side direction of the cam.

Figure 1:
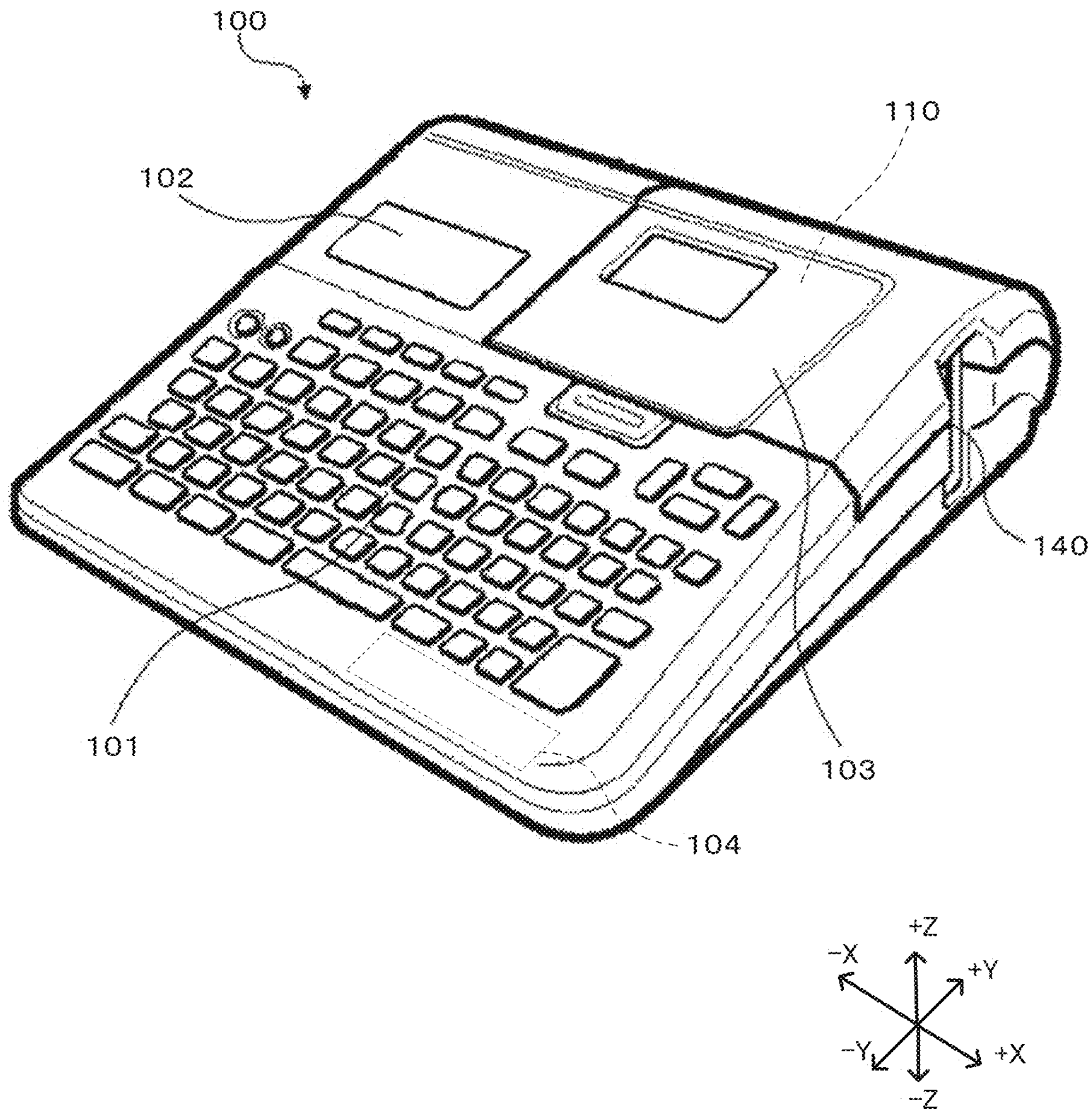
FIG. 1 is a perspective view of a printing device according to an embodiment of the present disclosure.

The printing device 100 according to the embodiment of the present disclosure is, for example, a tape printer (a label printer) with the exterior as illustrated in FIG. 1 that prints a letter, a number, a symbol, an emoji, a figure, and/or the like (hereinafter, referred to as "a print pattern") on a printing tape.

Figure 3A:
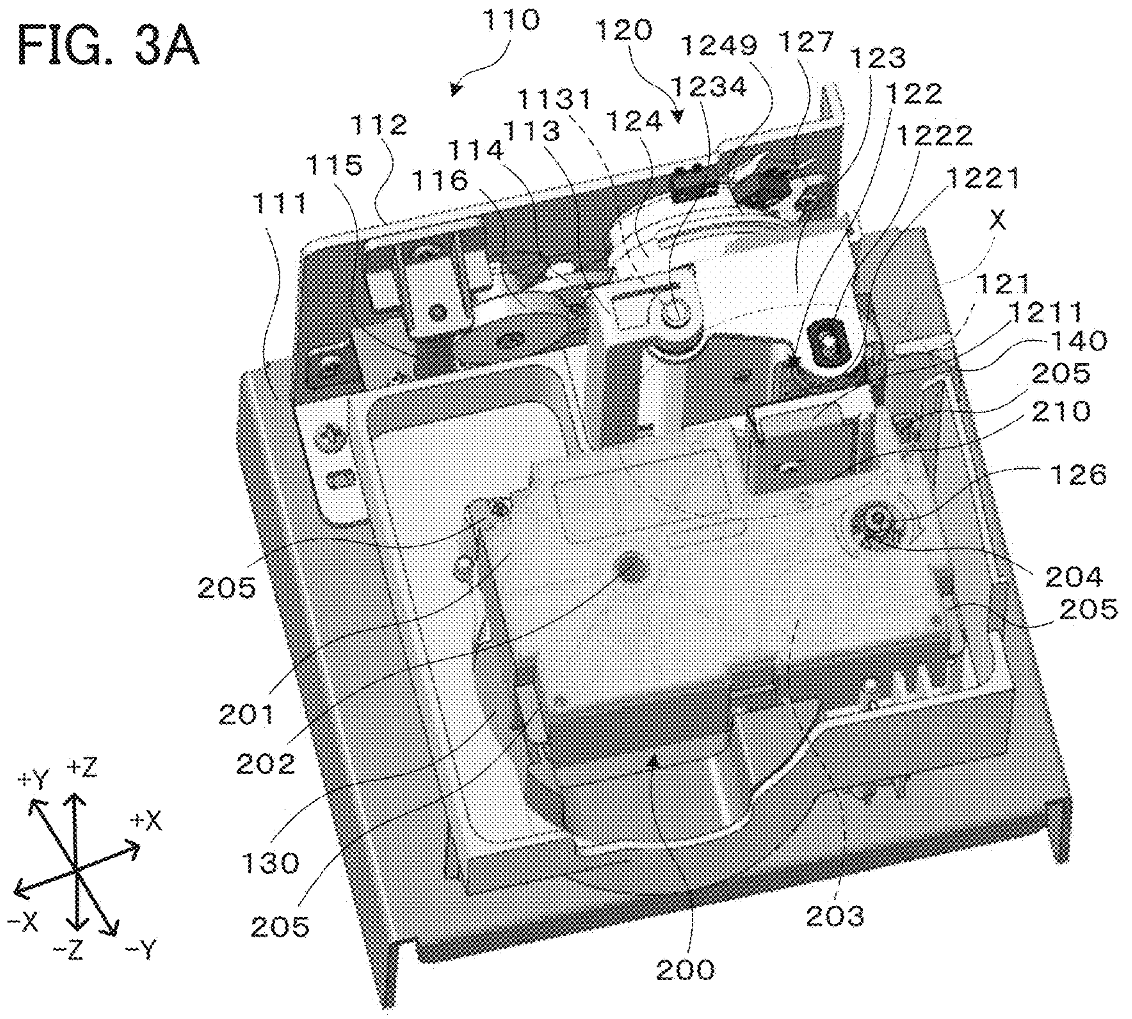
FIG. 3A is a perspective view of the label creator that accommodates a tape cartridge.
Figure 3B:
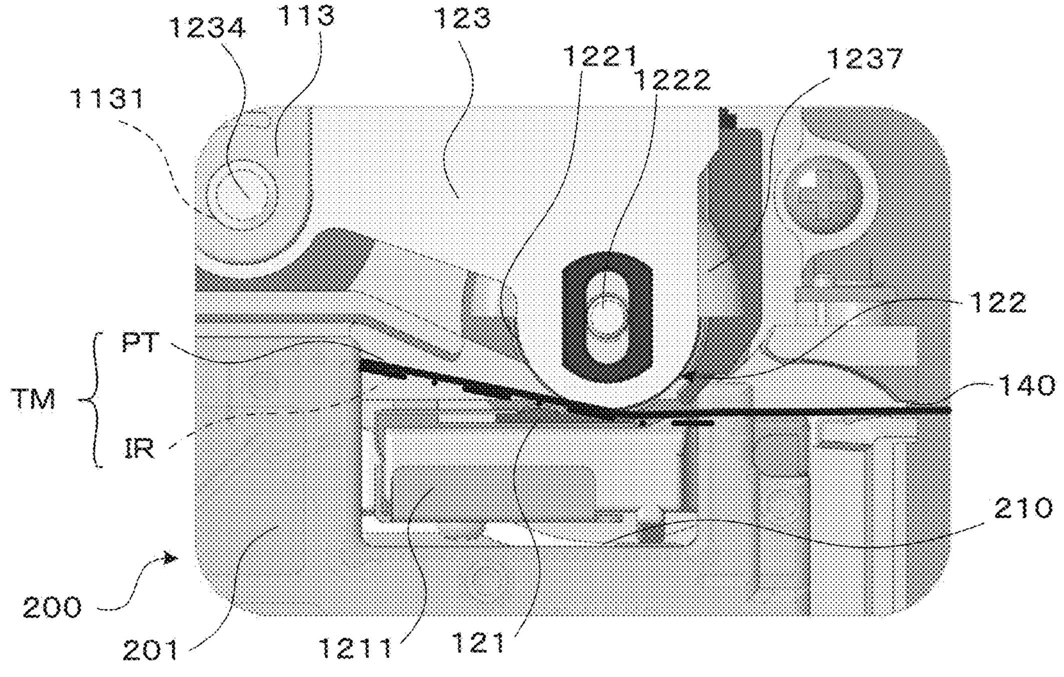
FIG. 3B is a partially enlarged view of the X portion of FIG. 3A.

The printing device 100 prints on the printing tape PT using a tape cartridge 200 that houses the printing tape PT to be printed and an ink ribbon IR (a tape-type recording medium TM) as illustrated in FIG. 3B.

Configuration of the Printing Device

The printing device 100, as illustrated in FIG. 1, comprises a keyboard 101 for inputting a print pattern, a display 102 for displaying an input print pattern and/or the like, and an open/close lid 103 for accommodating a tape cartridge 200 in the printer device 100. The printing device 100 also comprises an input/output terminal for connecting to an external device such as a personal computer, a power supply terminal to which a power cord is connected or a battery compartment to house a battery, and an insertion slot into which a memory card or other storage medium is inserted, although these components are not illustrated in the figure.

The keyboard 101 accepts a key input from a user. The keyboard 101 includes a pattern input key for inputting pattern data, a print key for instructing to start to print, a cursor key for moving a cursor on a display screen of the display 102, and various function keys for setting a print mode and performing various setting processing.

The display 102 functions as the main display screen of the printing device 100 and displays an image related to input data, a selection menu for various settings, a message related to various processing, and/or the like. The display 102 is configured by, for example, a liquid crystal display panel. Note that the keyboard 101 and the display 102 may be configured as a combination of input and display functions, such as a touch panel with touch switch functionality.

The open/close lid 103 is a cover that covers a label creator 110 formed inside the printing device 100 and loaded with a tape cartridge 200 for creating a label printed with a print pattern.

As illustrated in FIGS. 1, 2A, 2B, and 3A, the printing device 100 is equipped with a label creator 110 for loading the tape cartridge 200. In the label creator 110, a tape printing mechanism 120 for printing on a printing tape PT housed in the tape cartridge 200 and a cartridge receptacle 130 for disposing the tape cartridge 200 at a predetermined position are formed.

Figure 2A:
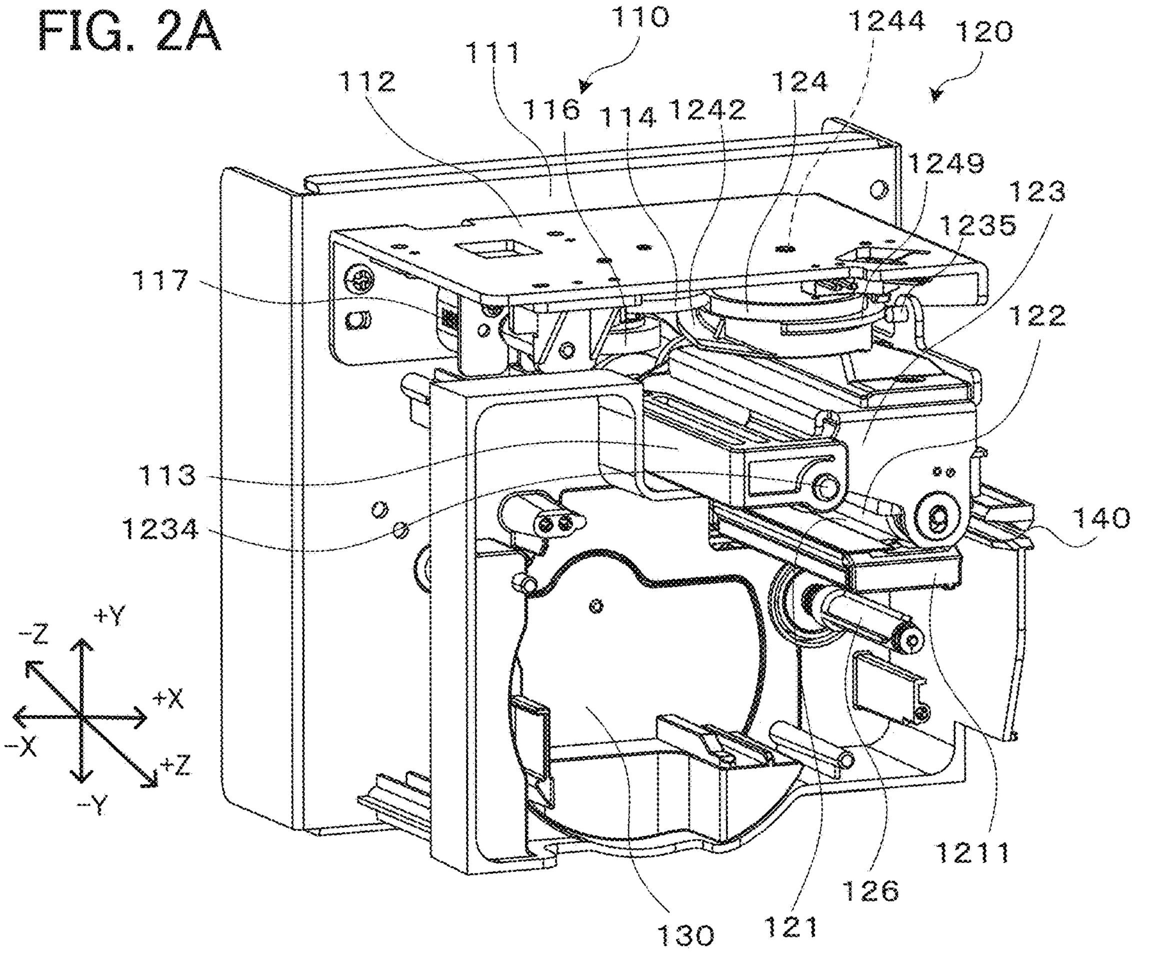
FIG. 2A is a perspective view of a label creator.
Figure 2B:
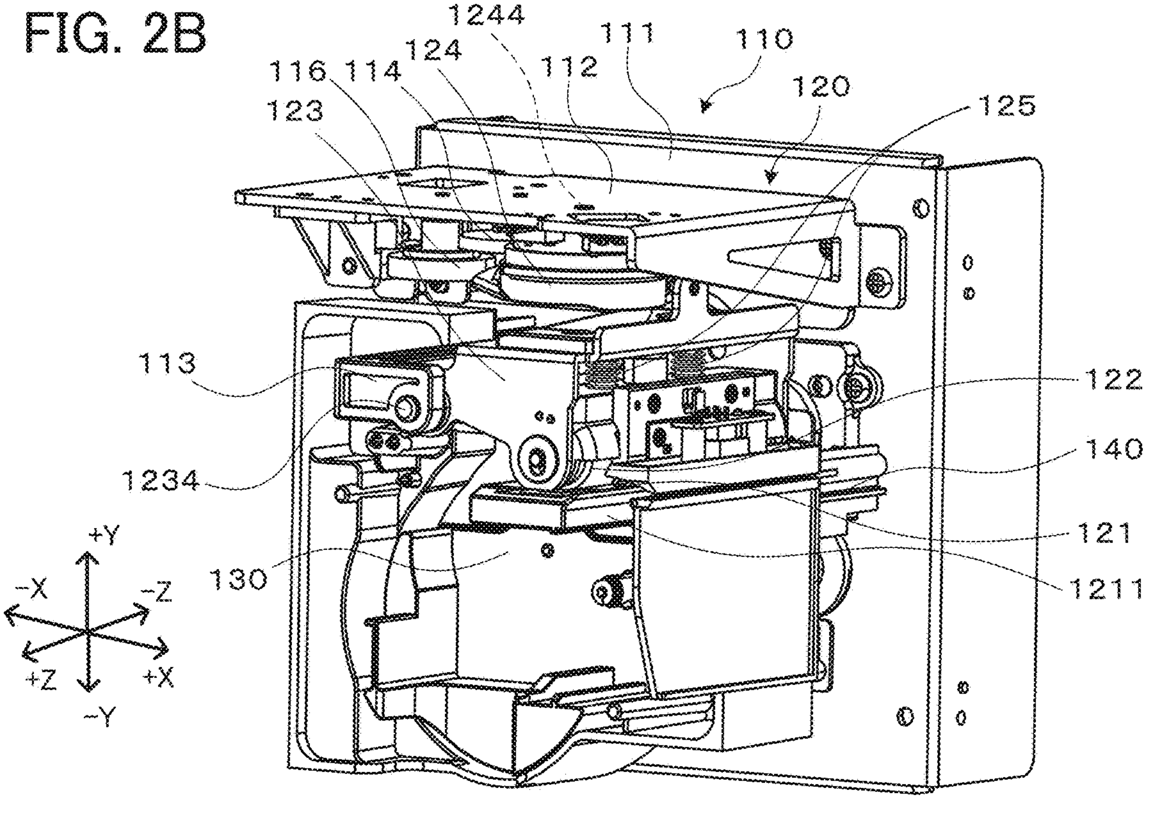
FIG. 2B is a perspective view of the label creator from a different viewpoint from FIG. 2A.

As illustrated in FIGS. 1, 2A, and 2B, the tape printing mechanism 120 and the cartridge receptacle 130 comprise: a substantially U-shaped plate mount 111, on a +Z side main surface of which disposed are members such as a cam shaft mount 112 and an arm mount 113; the cam shaft mount 112 erected along the vicinity of the +Y direction side edge of the mount 111; and the arm mount 113 erected near the center of the mount 111 and supporting the arm 123, described later, in a swingable (rotatable) manner.

The mount 111 is mounted with the cam shaft mount 112, the arm mount 113, the cartridge receptacle 130, a motor 117 that rotates the cam 124 described later, a gear (not illustrated) that rotates a platen roller 122 described later, and the like. As illustrated in FIGS. 2A, 2B, and 3A, a gear 114 that transmits driving power from the motor 117, to which rotation shaft a worm 115 is attached, to a cam shaft 1244 and the cam 124 described later, a worm wheel 116 constituting a worm gear, and the like are mounted at the +Y direction ends rotatably about the Y axis on the cam shaft mount 112. The motor 117 supplies driving power not only to the rotation of the cam 124 but also to a half-cut mechanism and a full-cut mechanism, described later, for cutting the printing tape PT illustrated in FIG. 3B. An arm 123 is mounted on the arm mount 113 via the arm rotation shaft 1234 so that the arm 123 can swing (rotate) around the Z axis.

The tape printing mechanism 120 comprises: a thermal head (a print head) 121 with a plurality of heat-generating elements arranged in a line to heat the ink ribbon IR; a platen roller (a conveyer) 122 which is arranged at a position facing the thermal head 121 and conveys a tape-type recording medium TM (the printing tape PT (illustrated by a bold line in FIG. 3B) and the ink ribbon IR (illustrated by an alternate long and short dash line in FIG. 3B)) in the direction of the tape discharge port 140 while holding the recording media TM with the thermal head 121; and an arm 123 that rotatably supports the platen roller 122. The tape printing mechanism 120 comprises: a cam 124 that separates the arm 123 from the thermal head 121 and presses the arm 123 toward the thermal head 121; springs (an elastic member) 125 that press the platen roller 122 toward the thermal head 121; and a ribbon winding shaft 126 that causes the ink ribbon IR used for printing to be wound up around a ribbon wind-up core 204, described later, in the tape cartridge 200.

The thermal head 121 is configured so that a plurality of heat-generating elements is arranged in alignment in the direction orthogonal to the longitudinal direction (discharge direction) of the tape-type recording medium TM (Z-axis direction). When the tape cartridge 200 is loaded into the label creator 110, the controller 104 causes the platen roller 122 to be pressed toward the thermal head 121 at a predetermined pressing force, so that the thermal head 121 contacts the surface (the print surface) of the printing tape PT via the ink ribbon IR as illustrated in FIG. 3B. The thermal head 121 selectively heats a plurality of heat-generating elements based on the print data generated from the input data and/or the like, and thermally transfers the ink of the ink ribbon IR onto the printing tape PT. The thermal head 121 is erected in the +Z direction on the main surface of the mount 111 by the thermal head fixer 1211 made of aluminum die-cast, and the main surface of the thermal head 121 is arranged so as to be horizontal to the main surface of the cam shaft mount 112.

Figure 4A:
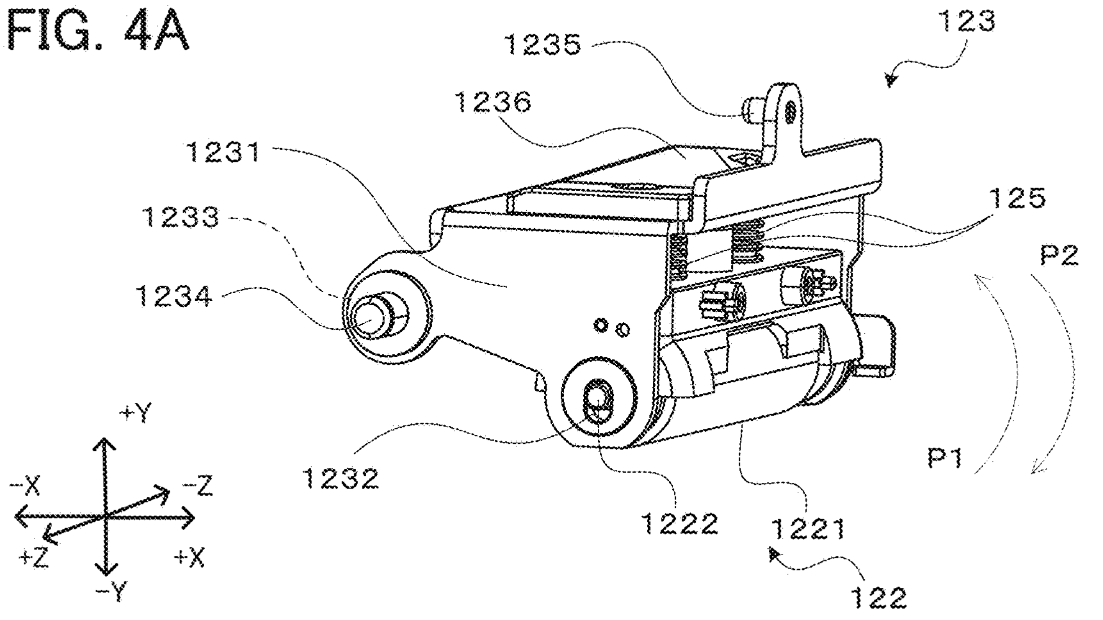
FIG. 4A is a perspective view of an arm to which a platen roller is attached.
Figure 4B:
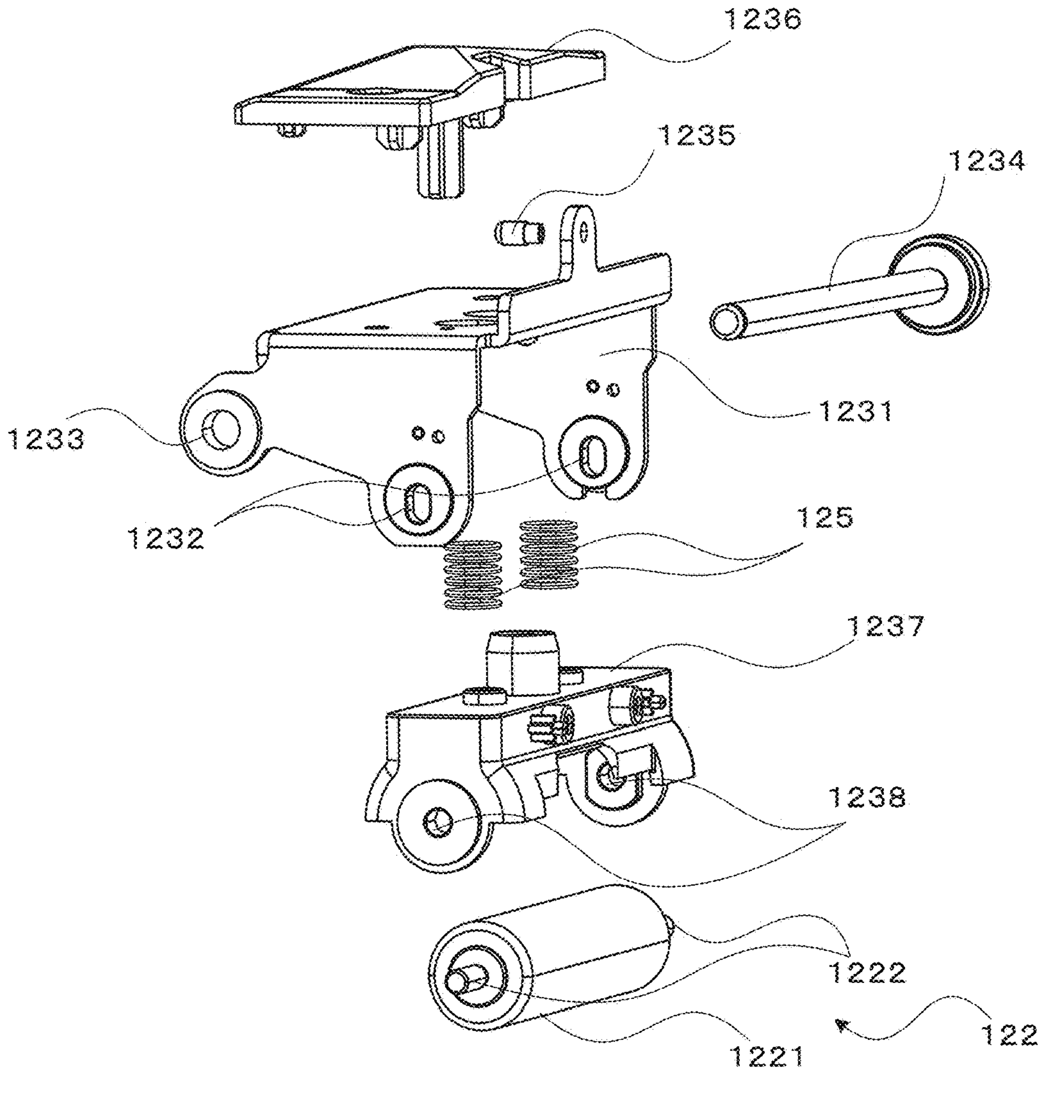
FIG. 4B is an exploded perspective view of FIG. 4A.

The platen roller 122 sends the tape-type recording medium TM toward the direction (the +X direction; the discharge direction) of the tape discharge port 140 and presses the tape-type recording medium TM toward the thermal head 121 at an appropriate pressing force during printing and alignment. The main body 1221 of the platen roller 122 illustrated in FIGS. 4A and 4B is configured, for example, as a cylindrical body or the like whose outer peripheral surface is covered with an elastic member such as rubber. The insertion shaft 1222 protruding from both ends in the longitudinal direction (the Z axis direction) of the platen roller 122 is rotatably inserted into the roller insertion holes 1232 and 1238 of the arm 123.

The arm 123 as a supporter supporting the thermal head 121 includes: a main body 1231 with an inverted T-shaped member protruding in the +Y direction from a substantially U-shaped member when viewed from the X-axis direction as illustrated in FIGS. 4A and 4B; roller insertion holes 1232 formed near the −Y direction side (the thermal head 121 side) end of the main body 1231; and an arm rotation shaft insertion hole 1233 formed near the −X direction (a far side from the tape discharge port 140) end of the main body 1231. Furthermore, the arm 123 includes: an arm rotation shaft 1234 that is inserted into the arm rotation shaft insertion hole 1233 and the arm rotation shaft insertion hole 1131 of the arm mount 113 illustrated in FIG. 3A; an engagement (a first guide receptacle) 1235 that can be engaged with a pressing releaser 1242 described later of the cam 124; a pressing receiver (a second guide receptacle) 1236 that is pressed by a presser 1243 and a light presser 1245 described later of the cam 124; and a platen roller pressing member 1237 that rotatably accommodates the platen roller 122 and presses the insertion shaft 1222 of the platen roller 122 in the −Y direction (the direction in which the thermal head 121 is arranged) by the pressing force of the springs 125. The roller insertion hole 1232 is formed in an oval shape with a major axis substantially in the Y-axis direction. The +Y-direction end of the major axis is set at a position where the insertion shaft 1222 can be moved to a position where the pressing force of the springs 125 on the platen roller 122 can be adjusted so that, when the arm 123 is closest to the thermal head 121, the platen roller 122 is pressed by the thermal head 121 at a standard pressing force described later. The −Y direction end of the major axis is set at a position where the platen roller 122 can secure a sufficient distance from the thermal head 121 (for example, a distance that can reserve a space for a user to easily set the tape cartridge 200) when the arm 123 is furthest from the thermal head 121. The roller insertion hole 1238 is formed in a circular shape with a diameter slightly larger than the diameter of the arm rotation shaft 1234. The pressing receiver 1236 protrudes in a mountain shape in the +Y direction, and the protruding shape is configured so that, when the pressing receiver 1236 is pressed by the presser 1243, the platen roller 122 is pressed at a standard pressing force, and, when pressed by the light presser 1245, the platen roller 122 is pressed at a light pressing force as described later.

The springs 125 constantly press the platen roller pressing member 1237 substantially toward the Y-axis direction (toward the thermal head 121 direction), and the platen roller pressing member 1237 presses the platen roller 122 substantially toward the Y-axis direction when the roller insertion holes 1232 press the insertion shaft 1222 substantially toward the Y-axis direction. At this time, the insertion shaft 1222 is constantly pressed substantially toward the Y-axis direction (toward the direction of the thermal head 121)

within the oval-shaped roller insertion hole 1232 with a major axis extending substantially in the Y-axis direction. Since the two springs 125 press portions of the insertion shaft 1222 closer to the respective springs 125, the springs 125 can press the platen roller 122 at a uniform pressing force.

The arm 123, configured as described above, can rotate (swing) about the arm rotation shaft 1234 as the rotation axis by a predetermined angle in the P1 direction and in the reverse direction P2 opposite to the P1 direction. The rotation angle of the arm 123 in the P1 direction is maximum when the engagement 1235 is engaged with the horizontal portion 1247, described later, of the pressing releaser 1242. At this time, the platen roller 122 accommodated in the platen roller pressing member 1237 is separated from the thermal head 121 by a maximum distance. The rotation angle of the arm 123 in the reverse direction P2 is maximum when the pressing receiver 1236 is pressed by the presser 1243. At this time, the platen roller 122 is pressed against the thermal head 121 at a standard pressing force.

As illustrated in FIGS. 5A to 5C, the cam 124 comprises: a substantially cylindrical main body 1241; a pressing releaser (a first cam surface, a first guide) 1242 inclined in the cam shaft 1244 direction of the cam 124 and protruding from the main body 1241 to one side in the circumferential direction of the main body 1241; a presser (a second cam surface, a second guide) 1243 protruding from a part of the end surface (the thermal head 121 side) of the main body 1241 in the axial direction (the −v direction) of the cam 124 and pressing the arm 123; a cam shaft 1244 that mounts the cam 124 to the cam shaft mount 112 rotatably around the Y axis (the v axis); and a light presser (a third cam surface, a third guide) 1245 that presses the arm 123 with a light pressing force than the presser 1243. The pressing releaser 1242 that releases the pressing of the platen roller 122 against the thermal head 121 comprises: as particularly illustrated in FIGS. 5B, 5C, 6A to 6C, an inclined portion (a first inclined portion) 1246 with a slanting surface that inclines in the cam shaft 1244 direction while protruding in the circumferential direction of the main body 1241 so as to connect the −v-direction end surface (the light presser 1245) on the presser 1243 side of the main body 1241 to the vicinity of the center of the v-axis direction of the main body 1241; and a horizontal portion 1247 with a surface (substantially horizontal to the XZ plane (the main surface of the thermal head 121)) continuous to the inclined portion 1246 and perpendicular to the cam shaft 1244 that protrudes in the circumferential direction from near the center of the v-axis direction of the main body 1241.

The cam 124 further comprises an inclined portion (a second inclined portion) 1248 with a slanting surface that inclines in the cam shaft 1244 direction while protruding in the circumferential direction of the main body 1241 so as to connect one end of the horizontal portion 1247 to the −v direction end surface (the light presser 1245) on the light presser 1245 side of the main body 1241; and a cam posture retention member 1249 with a similar structure to the horizontal portion 1247. The inclined portion 1248 presses the pressing receiver 1236 with the −v side surface of the slanting surface. The inclined portion 1248 may also comprise a second cam surface together with the presser 1243. The cam posture retention member 1249 has a surface perpendicular to the cam shaft 1244 and protruding in the circumferential direction from near the center of the v-axis direction of the main body 1241.

Note that the inclined surface of the inclined portion 1246 and the inclined surface of the inclined portion 1248 are formed in approximately plane symmetry with respect to the vw plane passing through the center of the cam shaft 1244 and the center of the horizontal portion 1247. The cam shaft 1244 is rotatably attached to the cam shaft mount 112 at the shaft end opposite to the presser 1243 side.

When the cam 124 rotates in an R1 direction (FIG. 5A) about the cam shaft 1244, the engagement 1235 of the arm 123 is engaged with the +v (+Y)-side surface of the inclined portion 1246 of the pressing releaser 1242. When the engagement 1235 is engaged with the inclined portion 1246, the engagement 1235 slides along the inclined portion 1246 and is displaced in the +Y direction, then, the arm 123 rotates in the +Y direction (rotates in a direction apart from the thermal head 121) by rotating about the arm rotation shaft 1234 in the P1 direction (FIG. 4A). When the cam 124 further rotates in the R1 direction about the cam shaft 1244, the engagement 1235 slides, while engaged with the inclined portion 1246, to the horizontal portion 1247 continuous to the inclined portion 1246 (FIG. 5B). At this time, the arm 123 rotates to the maximum angle in the P1 direction and rotates furthest in the +Y direction (most separate from the thermal head 121). When the cam 124 further rotates in the R1 direction about the cam shaft 1244, the pressing receiver 1236 is pressed by the −v-direction surface of the inclined portion 1248 continuous to the horizontal portion 1247, and the amount of pressing increases as the rotation amount increases. Thereby, the arm 123 rotates and moves in the reverse direction P2 opposite to the P1 direction about the arm rotation shaft 1234 (rotates in the direction of pressing against the thermal head 121), and eventually the engagement between the engagement 1235 and the inclined portion 1248 is released at the −v-direction end of the inclined portion 1248. When the cam 124 further rotates in the R1 direction about the cam shaft 1244, the pressing receiver 1236 is pressed (pressed at a standard pressing force) by the presser 1243, and the arm 123 rotates to the maximum angle in the −Y direction (closest to the thermal head). When the cam 124 further rotates in the R1 direction about the cam shaft 1244, the pressing receiver 1236 is pressed by the light presser 1245 as illustrated in FIG. 5B (pressed with a light pressing force). When the cam 124 further rotates in the R1 direction about the cam shaft 1244, the engagement 1235 of the arm 123 is engaged again with the +v (+Y)-side surface of the inclined portion 1246 of the pressing releaser 1242.

Figure 7:
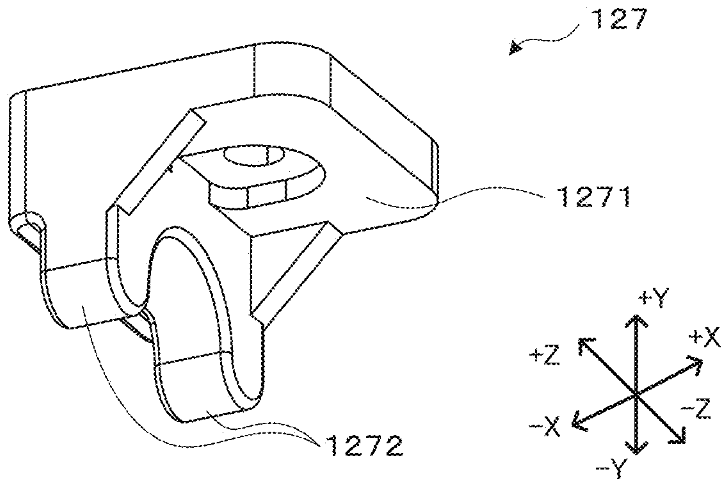
FIG. 7 is a perspective view of a cam support member.

As illustrated in FIGS. 3A and 5C, the cam support member 127 rotatably supports the cam posture retention member 1249, thereby suppressing misalignment of the rotation axis of the cam 124. As illustrated in FIGS. 3A and 7, the cam support member 127 comprises a base 1271 attached to the cam shaft mount 112 and two cam support protrusions 1272 perpendicularly disposed from the base 1271 to support the cam posture retention member 1249. By including two cam support protrusions 1272, the cam support member 127 can more effectively suppress the cam 124 from tilting.

As illustrated in FIG. 5C, when the presser 1243 or the light presser 1245 (or the slanting surface between the presser 1243 and the light presser 1245) presses the pressing receiver 1236, the cam posture retention member 1249 slides into and is supported by (the cam support protrusions 1272 of) the cam support member 127 perpendicularly disposed on the cam shaft mount 112. This allows, when the pressing receiver 1236 is being pressed, the pressing receiver 1236 to be pressed at an appropriate pressing force while suppressing the cam 124 from tilting (the rotation axis of the cam 124 from shifting, tilting).

As illustrated in FIGS. 1 to 3A and 3B, a tape discharge port 140 communicating with the exterior of the printing device 100 is formed near the +X-direction side surface of the label creator 110. While not illustrated in the drawings, the tape discharge port 140 incorporates a full-cut mechanism that cuts the printing tape PT and liner tape of the tape-type recording medium TM in the width direction and a half-cut mechanism that cuts only the printing tape PT of the tape-type recording medium TM.

As illustrated in FIG. 3A, the tape cartridge 200 comprises a cartridge case 201. The cartridge case 201 incorporates a tape core 202 about which the printing tape PT illustrated in FIG. 3B winds, a ribbon supply core 203 about which an unused ink ribbon IR winds, and a ribbon wind-up core 204 that winds a used ink ribbon IR. In addition, the cartridge case 201 includes a head arrangement section 210 where the thermal head 121 is located when the tape cartridge 200 is loaded in the label creator 110.

Also, as illustrated in FIG. 3A, engagement receivers 205 are formed at the four corners of the cartridge case 201 that are engaged with the cartridge receptacle 130 of the label creator 110 and supported by the cartridge receptacle 130. The engagement receivers 205 of the cartridge case 201 are formed with predetermined irregularities, not illustrated, depending on the type of tape cartridge 200. In addition, predetermined recording width detection switches (not illustrated) are disposed on the cartridge receptacle 130 of the label creator 110 to detect irregularities formed on the engagement receivers 205 of the cartridge case 201 when the tape cartridge 200 is loaded.

When tape cartridge 200 is loaded in the label creator 110, the engagement receivers 205 of the cartridge case 201 are engaged with some or all of the recording width detection switches that are disposed on the cartridge receptacle 130 of the label creator 110. The recording width detection switches engaged with the engagement receivers 205 are pressed down. The controller 104 of the printing device 100 determines the type of the tape cartridge 200 by a combination of the recording width detection switches that have been switched on.

The controller 104 is configured by a processing device such as a processor. By operating in accordance with a program stored in a read only memory (ROM), which is not illustrated, the controller 104 creates print data, executes printing of a print pattern, controls the cam rotation angle, the full-cut mechanism, the half-cut mechanism, and/or the like.

Operation of Printing Device

Figure 6A:
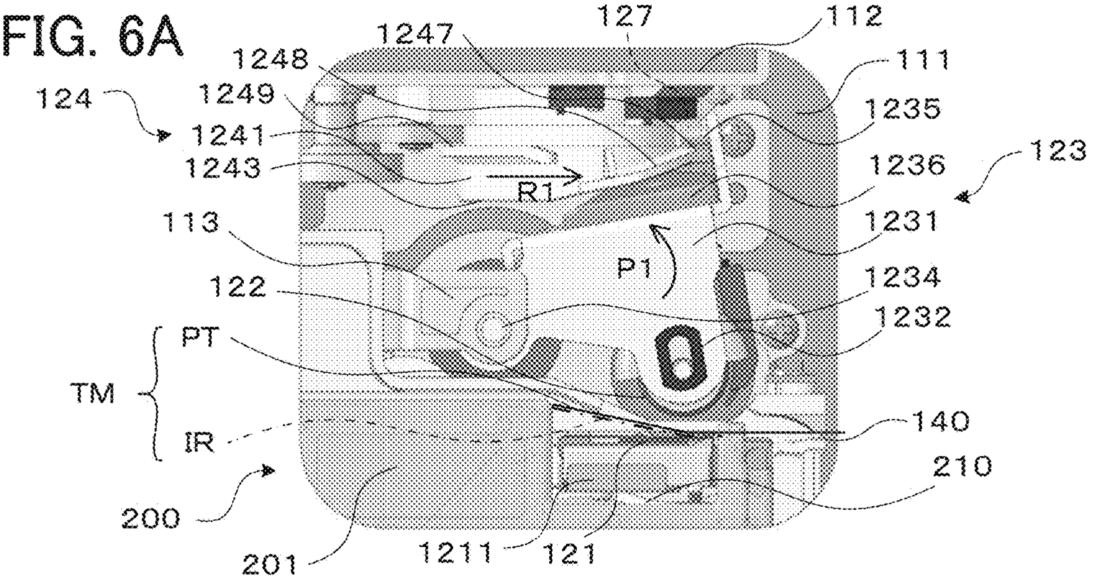
FIG. 6A is a plan view of a state in which the platen roller is spaced apart from a thermal head.

First, when a user turns on the printing device 100, the controller 104 is activated. Upon activation, the controller 104 drives the motor 117 to rotate the cam 124 counterclockwise (the R1 direction) about the cam axis 1244 (rotate the cam 124 counterclockwise when the printing device 100 is viewed planarly), and the engagement 1235 of the arm 123 is engaged with the inclined portion 1246 of the pressing releaser 1242 of the cam 124. Thereafter, the engagement 1235 remains engaged while moving along the slope of the inclined portion 1246, and the arm 123 rotates about the arm rotation shaft 1234 as the rotation axis counterclockwise (in the P1 direction of FIG. 4A). Thereafter, as illustrated in FIG. 6A, when the engagement 1235 of the arm 123 is engaged with the horizontal portion 1247, the controller 104 stops driving the motor 117 and stops rotating the cam 124. At this time, the arm 123 is in a state in which the arm rotation shaft 1234 is rotated counterclockwise about the rotation axis at the maximum angle, and the platen roller 122 is spaced apart from the thermal head 121 by a maximum distance. When this state is reached, the controller 104 unlocks the open/close lid 103, and the user sets the tape cartridge 200 in the cartridge receptacle 130 by opening and closing the open/close lid 103. Since the platen roller 122 is spaced apart by the maximum distance from the thermal head 121, the user can easily set the tape cartridge 200 (or replace a tape cartridge 200 with another tape cartridge 200).

Figure 6B:
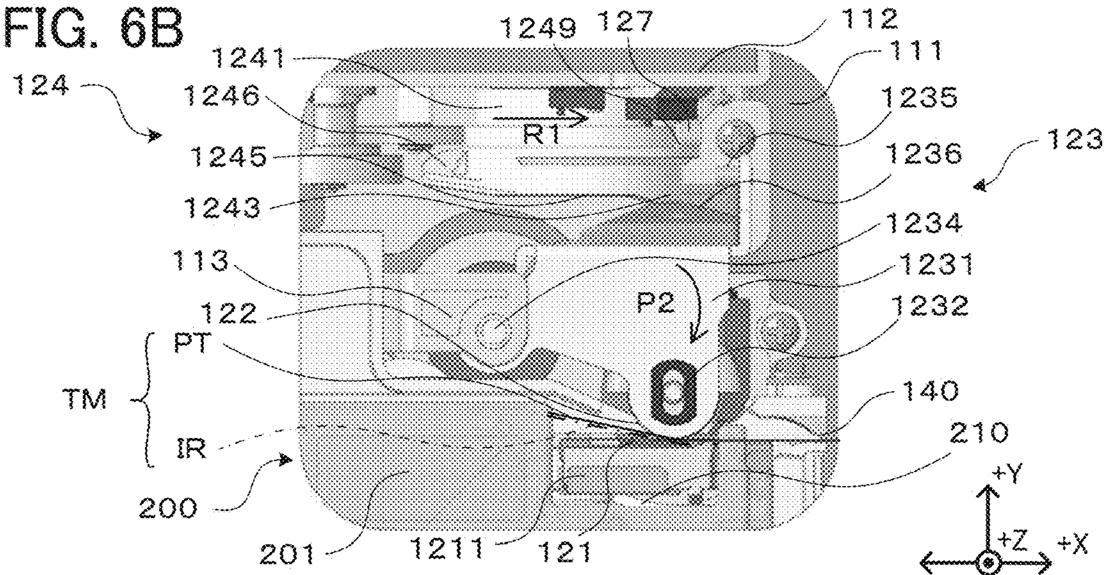
FIG. 6B is a plan view in which the platen roller is pressed toward the thermal head with a standard pressing force.
Figure 6C:
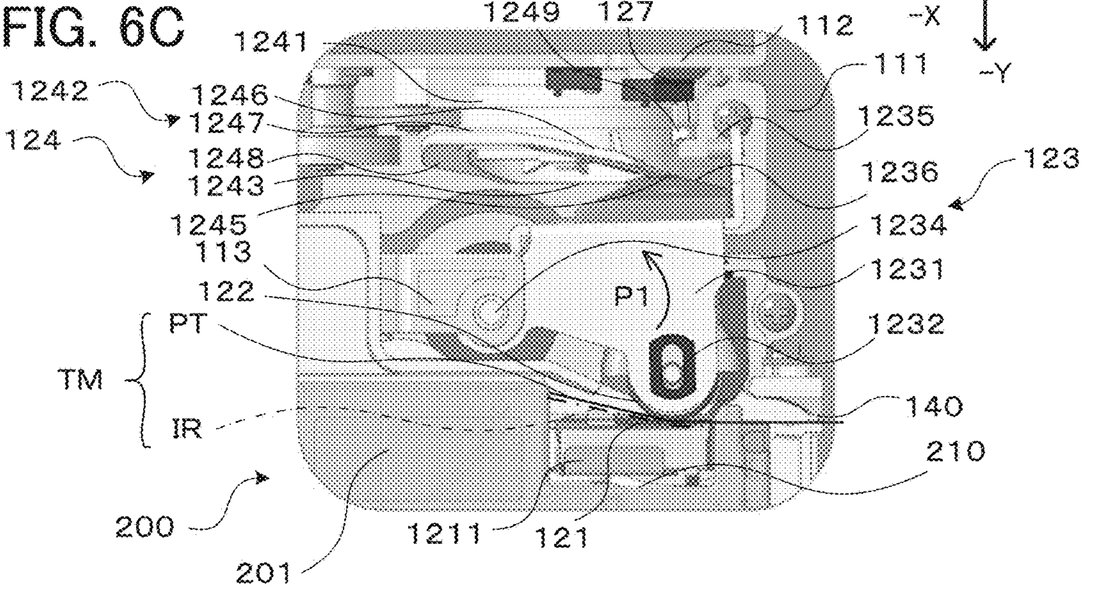
FIG. 6C is a plan view of a state in which the platen roller is pressed toward the thermal head with a light pressing force.

After setting the tape cartridge 200, the controller 104 rotates the cam 124 counterclockwise (the R1 direction) again; the pressing receiver 1236 is pressed by the –v-direction surface of the inclined portion 1248 with the amount of pressing increasing as the amount of rotation increases, while the engagement state is maintained as the engagement unit 1235 moves along the slope of the inclined portion 1248; then, the arm 123 in turn rotates clockwise about the arm rotation shaft 1234 as the rotation axis. Thereafter, as illustrated in FIG. 6B, by rotating the cam 124 by a predetermined angle in the direction of the arrow R1 from the time the tape cartridge 200 is set, the engagement between the engagement 1235 and the inclined portion 1248 is released, and the pressing receiver 1236 of the arm 123 is pressed against the presser 1243 of the cam 124. Then, the controller 104 stops the rotation of the cam 124. At this time, the arm 123 rotates clockwise (the P2 direction) about the arm rotation shaft 1234 as the rotation axis to the maximum angle, and the platen roller 122 approaches the thermal head 121 to the closest distance via the tape-type recording medium TM. At this time, the platen roller 122 and the tape-type recording medium TM are pressed by the arm 123 toward the thermal head 121 at a pressing force of 500 g/cm$^2$ (a standard pressing force) suitable for printing on the printing tape PT.

The printing device 100 then detects the type of tape cartridge 200 to identify the recording width, color, and/or the like of the printing tape PT housed in the tape cartridge 200 and cuts the margins of the +X-direction end of the printing tape PT by the full-cut mechanism or the half-cut mechanism depending on the setting. The user inputs the information of print data, and the controller creates print data that conforms to the recording width of the printing tape PT whereby the print pattern becomes printable.

When printing execution is instructed by operation of the keyboard 101, the controller 104 causes the printing tape PT and the ink ribbon IR to be rolled out respectively from the tape core 202 and the ribbon supply core 203 of the tape cartridge 200. These printing tape PT and ink ribbon IR and conveyed in a superimposed state and sandwiched between the platen roller 122 and the thermal head 121.

Thereafter, the printing device 100 prints on the printing tape PT while maintaining the standard pressing force and halting the rotation of the cam 124. The heat-generating elements of the thermal head 121 are driven exothermally based on the print data, and the ink on the ink ribbon IR is printed as a print pattern on the printing tape PT.

When printing ends, the full-cut mechanism or half-cut mechanism is activated to cut the printing tape PT in the width direction and create a single piece of tape-type label.

Thereafter, the printing device 100 adjusts the printing position of the printing tape PT in preparation for the next printing. Specifically, the controller of the printing device 100 rotates the cam 124 by a predetermined angle in the P direction to reach the state illustrated in FIG. 6C. At this time, the light presser 1245 presses the pressing receiver 1236 with a pressing force (light pressing force) of 360 g/cm$^2$ which is lighter than the presser 1243. Thereby, the rotation of the platen roller 122 can be transmitted to the tape-type recording medium TM while suppressing the adhesion of excess ink to the printing tape PT at the time of print alignment and preventing the printing tape PT and the ink ribbon IR from shifting.

As described above, the printing device 100 can separate the arm 123 from the thermal head 121 by rotating the cam 124 and engaging the pressing releaser 1242 with the engagement 1235 and can press the platen roller 122 toward the thermal head 121 by means of the inclined portion 1248, the presser 1243, the light presser 1245, and the springs 125. In other words, unlike a conventional printing device that uses different springs for pressing the platen roller against the thermal head and for separating the platen roller from the thermal head, the printing device 100 of the present embodiment uses only the spring for pressing the platen roller 122 in a direction toward the thermal head 121. Therefore, since the printing device 100 can keep the spring tolerance small compared to the conventional printing device, pressing of the platen roller 122 against the printing tape PT (and the thermal head 121) and separating of the platen roller 122 from the thermal head 121 can be performed more preferably. Further, by rotating the cam 124, the printing device 100 can change the pressing force as necessary by pressing either the presser 1243 against the pressing receiver 1236 or the light presser 1245 against the pressing receiver 1236. In this way, the printing device 100 can obtain an appropriate pressing force with high accuracy, thereby improving the printing quality. Further, the printing device 100 has a structure in which the arm 123 accommodates the springs 125 and the platen roller 122 that contributes to saving space.

Modification Examples

Although, in the above embodiment, the printing device 100 comprises the keyboard 101 and the display 102, the printing device 100 may be a printing device without a keyboard and wiredly or wirelessly connected to a personal computer, a tablet, a smartphone, and/or the like, or the printing device 100 may be a printing device without a keyboard or display.

Although a tape-type recording medium TM including an ink ribbon IR and a printing tape PT was used in the above embodiment, a thermal recording medium or the like that does not use an ink ribbon may be used.

Figure 8:
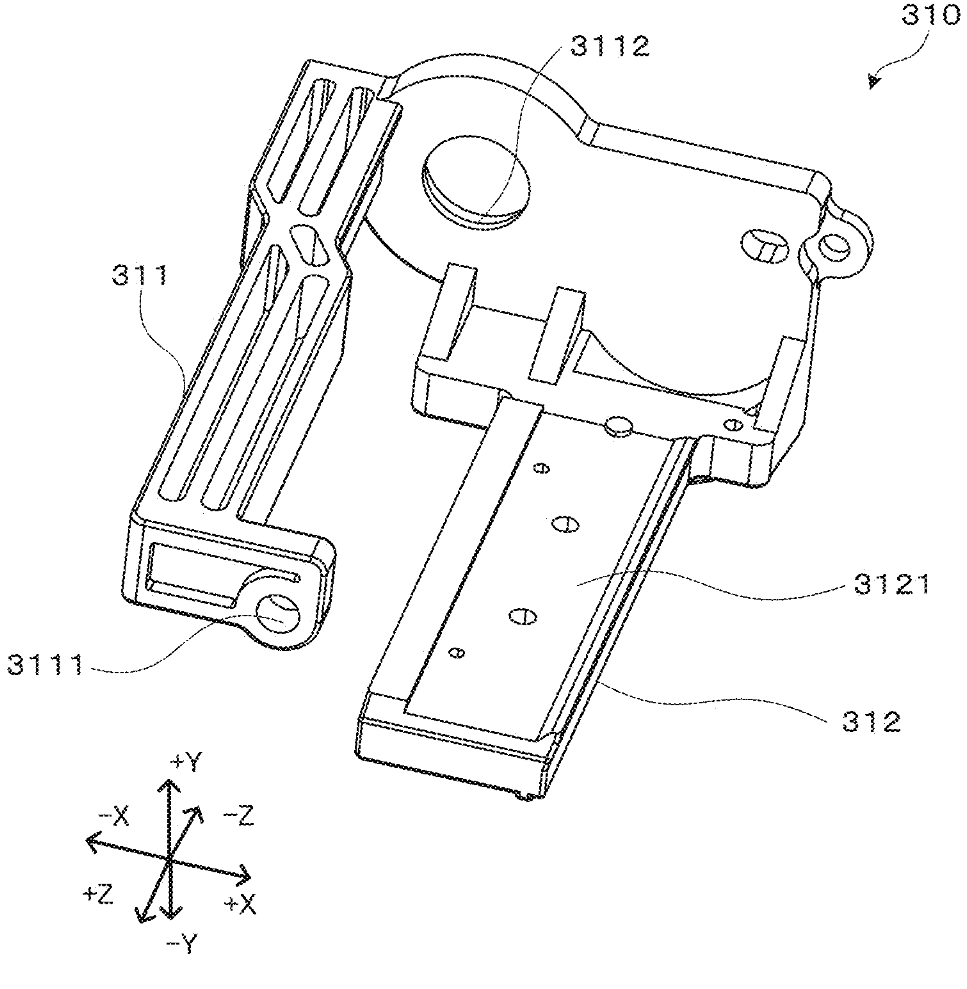
FIG. 8 is a perspective view of a mounting member for mounting a thermal head and/or the like according to a modification example.

Although, in the above embodiment, the printing device 100 comprises the arm mount 113 and the thermal head fixer 1211 as separate members, the printing device 100 may use, as illustrated in FIG. 8, for example, an aluminum die-cast thermal head mounting member 310 comprising an arm mount 311 with insertion holes 3111, 3112 through which the arm rotation shaft 1234 is rotatably inserted and a thermal head fixer 312 with a recess 3121 capable of mating with the thermal head 121. In this way, the thermal head 121 can be fixed more firmly, and the arm 123 can be stably supported even when the arm 123 repeatedly swings, thereby improving the print quality.

In the above embodiment, the printing device 100 has a configuration in which the presser 1243, the light presser 1245, and the inclined portion 1248 of the cam 124 press the arm 123. However, one or two of the presser 1243, the light presser 1245, and the inclined portion 1248 may be formed in the cam 124, or the cam may have four or more parts that press the arm 123 with different pressing forces.

Although, in the above embodiment, the springs 125 press the platen roller 122 toward the thermal head 121, the printing device 100 may have a configuration in which only the cam may be used to space the platen roller 122 apart from the thermal head 121 or press the platen roller 122 toward the thermal head 121 without using the springs.

Although, in the above embodiment, the printing device 100 uses two springs 125 to press the platen roller 122 toward the thermal head 121, the printing device may use three or more or one spring, or the printing device may use rubber or other elastic members instead of springs.

In the above embodiment, the printing device 100 separates the platen roller 122 from the thermal head 121 by engaging the pressing releaser 1242 with the engagement 1235 in such a way that the engagement unit 1235 is placed on the +Y direction of the pressing releaser 1242. However, for example, the platen roller 122 may be separated from the thermal head 121 by attracting a metal engagement to a magnetic protrusion.

In the above embodiment, in the printing device 100, the cam 124 rotates in conjunction with the full-cut mechanism or half-cut mechanism. However, the cam 124 may rotate independently of the full-cut mechanism or half-cut mechanism, or the cam 124 may rotate in conjunction with the winding-up of the ink ribbon IR or other operations. Instead of being driven by the motor, the cam may rotate by open and close operations of the open/close lid 103, insertion and removal of the tape cartridge 200, or a manual operation.

Further, although, in the above embodiment, the printing device 100 rotates the cam 124 about the Y axis, the cam may rotate, for example, in the same direction as the platen roller 122 (about the Z axis).

In the above embodiment, the printing device 100 comprises the arm 123 that houses the platen roller pressing member 1237 and the springs 125, but the printing device 100 may comprise a supporter that does not use elastic members such as springs or a platen roller pressing member.

In the above embodiment, the printing device 100 comprises the thermal head 121, but the printing device 100 may use a non-thermal type print head such as an inkjet-type print head to print on a non-thermal type paper tape or the like that does not require an ink ribbon.

In the above embodiment, the printing device 100 uses the cam 124 to separate the platen roller 122 away from the thermal head 121 or press the platen roller 122 toward the thermal head 121 when the tape is conveyed toward the tape discharge port 140, but these operations may be performed when the tape is conveyed in a direction opposite to the tape discharge port 140.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled

What is claimed is:

1. A printing device, comprising:

a print head for printing on a tape;

a platen roller for conveying the tape by rotation with the tape held between the print head and the platen roller;

a supporter for rotatably supporting the platen roller; and a cam including a first guide for releasing pressing of the platen roller against the print head and a second guide for pressing the platen roller against the print head, wherein:

the supporter includes a guide receptacle for moving the platen roller, the guide receptacle comprises a first guide receptacle that is engageable with the first guide and a second guide receptacle that is pressable against the second guide, the cam releases the pressing of the platen roller against the print head by engaging the first guide with the first guide receptacle and presses the platen roller against the print head by causing the second guide to press the second guide receptacle towards the print head, and the cam is rotatable about a first rotation axis extending in a direction that intersects a second rotation axis about which the platen roller rotates and a direction in which the tape is conveyed, thereby causing the first guide to slide into the first guide receptacle and the second guide to press the second guide receptacle towards the print head.

2. The printing device according to claim 1, wherein:

the first guide comprises a first inclined portion with a slanting surface with an inclination toward an axial direction of the first rotation axis and projecting from the cam in a circumferential direction of the cam, and the cam rotates about the first rotation axis such that the first guide receptacle is engaged with and slides along the first inclined portion, thereby increasing a distance between the platen roller and the print head.

3. The printing device according to claim 2, wherein:

the first guide further comprises a horizontal portion with a surface that is continuous to the first inclined portion and perpendicular to the first rotation axis, and when the first guide receptacle is engaged with the horizontal portion, the platen roller is separated furthest from the print head.

4. The printing device according to claim 1, wherein the cam further comprises a third guide that presses the supporter toward the print head at a lesser pressing force than the second guide.

5. The printing device according to claim 1, further comprising:

an elastic member for pressing the platen roller against the print head, wherein the supporter comprises:

a roller insertion hole that movably supports a rotation shaft of the platen roller along a direction of separating from the print head and approaching the print head; and a platen roller pressing member that presses the rotation shaft of the platen roller with a pressing force of the elastic member.

6. The printing device according to claim 5, wherein:

the elastic member comprises at least two springs, and the elastic member and the platen roller are housed in the supporter.

7. A printing device, comprising:

a print head for printing on a tape;

a platen roller for conveying the tape by rotation with the tape held between the print head and the platen roller;

a supporter for rotatably supporting the platen roller;

a cam including a first guide for releasing pressing of the platen roller against the print head and a second guide for pressing the platen roller against the print head; and a cam support member for suppressing misalignment of a rotation axis of the cam by supporting a cam posture retention member formed in the cam when the cam presses the platen roller against the print head.

8. A printing method, comprising:

separating a platen roller, that conveys a tape by rotation, from a print head that prints on the tape, by engaging a first guide receptacle formed in a supporter that rotatably supports the platen roller with a first guide formed in a cam by causing the first guide to slide into the first guide receptacle by rotation of the cam in a state in which the platen roller is pressed against the print head with the tape held between the print head and the platen roller, the cam being rotatable about a first rotation axis extending in a direction that intersects a second rotation axis about which the platen roller rotates and a direction in which the tape is conveyed; and pressing the platen roller against the print head by causing a second guide formed in the cam to press a second guide receptacle formed in the supporter towards the print head by rotation of the cam.

* * * * *